United States Patent
Perry et al.

(10) Patent No.: US 12,323,230 B2
(45) Date of Patent: Jun. 3, 2025

(54) RECONFIGURABLE PASSIVE TERMINAL THAT MANAGES ACCESS TO AN OPTICAL CHANNEL SPECTRUM

(71) Applicant: AT&T Intellectual Property I, L.P., Atlanta, GA (US)

(72) Inventors: Ricky Perry, Cumming, GA (US); Stewart Barker, Lucas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 17/976,947

(22) Filed: Oct. 31, 2022

(65) Prior Publication Data

US 2024/0146438 A1 May 2, 2024

(51) Int. Cl.
  *H04J 14/02* (2006.01)
  *H04B 10/27* (2013.01)

(52) U.S. Cl.
  CPC .......... *H04J 14/0227* (2013.01); *H04B 10/27* (2013.01)

(58) Field of Classification Search
  CPC ............................. H04B 10/27; H04J 14/0227
  USPC ............................................................ 398/58
  See application file for complete search history.

(56) References Cited

U.S. PATENT DOCUMENTS

| | | |
|---|---|---|
| 5,526,439 A | 6/1996 | Bergmann |
| 8,446,232 B2 | 5/2013 | Abbaspour-tamijani et al. |
| 11,438,088 B1 * | 9/2022 | Perry .................. H04J 14/0282 |
| 2003/0002809 A1 | 1/2003 | Jian |
| 2004/0197041 A1 | 10/2004 | Lu et al. |
| 2004/0208622 A1 | 10/2004 | Grosz et al. |
| 2005/0277327 A1 * | 12/2005 | Aziz ..................... H05K 7/1448 439/528 |
| 2005/0282413 A1 * | 12/2005 | Israel ................... G02B 6/4261 439/76.1 |
| 2008/0085079 A1 | 4/2008 | Dimmick et al. |
| 2010/0311383 A1 | 12/2010 | Abbaspour-tamijani et al. |
| 2014/0341574 A1 * | 11/2014 | Yan ..................... H04J 14/0265 398/49 |
| 2015/0071639 A1 * | 3/2015 | Stone .................. H04J 14/0227 398/79 |

(Continued)

FOREIGN PATENT DOCUMENTS

| | | | | |
|---|---|---|---|---|
| CN | 106896453 B | * | 11/2019 | .......... G02B 6/4204 |
| CN | 212435711 U | * | 1/2021 | |

(Continued)

*Primary Examiner* — Amritbir K Sandhu
(74) *Attorney, Agent, or Firm* — Guntin & Gust, PLC; Miyoung Shin

(57) ABSTRACT

Aspects of the subject disclosure may include, for example, a housing that includes a first waveguide port and a second waveguide port, wherein the first waveguide port is configured for receiving an optical signal via a first optical waveguide optically coupled to the first waveguide port. The housing may include a passive optical processing module that is removably coupled to the housing and optically coupled to the first waveguide port. The passive optical processing module is configured to perform a prescribed function, e.g., filtering, upon the optical signal to obtain a processed optical signal without utilizing an electronic circuit. The second waveguide port is configured to transfer the processed optical signal to an optical waveguide external to the housing. Other embodiments are disclosed.

20 Claims, 10 Drawing Sheets

(56) References Cited

U.S. PATENT DOCUMENTS

| | | | |
|---|---|---|---|
| 2015/0249520 A1* | 9/2015 | Badar | H04J 14/0245 398/79 |
| 2018/0011217 A1 | 1/2018 | Womack | |
| 2020/0045389 A1 | 2/2020 | Maskuriy et al. | |

FOREIGN PATENT DOCUMENTS

| | | | | |
|---|---|---|---|---|
| CN | 115022745 A | * | 9/2022 | |
| EP | 1463223 A1 | * | 9/2004 | H04J 14/02 |
| EP | 2445125 A1 | * | 4/2012 | G02B 6/28 |
| WO | WO-2016068966 A1 | * | 5/2016 | G02B 6/3825 |

* cited by examiner

500

RECONFIGURABLE PASSIVE TERMINAL THAT MANAGES ACCESS TO AN OPTICAL CHANNEL SPECTRUM

FIELD OF THE DISCLOSURE

The subject disclosure relates to a reconfigurable passive terminal that manages access to an optical channel spectrum.

BACKGROUND

Dedicated leased lines between specific sites have been used by telecommunications customers with a high volume of communications between those sites. Such leases generally impose tariffs based on a line length and/or maximum bit rate. Leased-line service offerings are also available for optical telecommunication services, including an option referred to as "dark fiber." According to a dark fiber service a communications company provides an optical fiber link, but none of the equipment at either end. Any selection and/or provisioning of supporting terminal equipment is left up to the customer leasing the optical fiber. Although a communications company supplying the optical fiber link may know the distance covered by the link, the do not have access to details, including a maximum bit rate being utilized by the customer.

Other fiber applications include passive optical network (PON) system that deploy optical fiber connected between an operator's central office and customers, e.g., home users and/or businesses. A main characteristic of a PON system is the utilization of passive splitters in the fiber distribution network, which enable a single feeding fiber to serve multiple homes and small businesses. Gigabit Passive Optical Networks (GPON) represent an evolutionary development of PON technology that supports higher data rates, enhanced security, and choice of Layer 2 protocol, e.g., ATM, GEM, Ethernet, allowing GPON customers to transfer data using IP-based protocols.

Wavelength division multiplexing (WDM) represents yet another fiber-optic transmission technique that enables the use of multiple light wavelengths (or colors) to transfer data over the same optical fiber. An application of WDM allows a single optical waveguide to support multiple communication channels. Each channel utilizes a respective optical carrier operating at different respective wavelengths or frequencies on the optical spectrum. Accordingly, two or more colors of light can travel on one fiber, simultaneously, to provide contentionless sharing of the same waveguide.

The standards division of the International Telecommunication Union (ITU-T) has classified optical transmission bands (O, E, S, C, L, U) to facilitate commercial adoption of optical communications, e.g., by enabling equipment from different vendors to interoperate. The ITU-T telecommunication wavelength bands include the O-band (original band with a wavelength range from 1260 to 1360 nm), the E-band (extended band: 1360 to 1460 nm), the S-band (short wavelength band: 1460 to 1530 nm), the C-band (conventional band: 1530 to 1565 nm), the L-band (long wavelength band: 1565 to 1625 nm), and the U-band (ultra-long wavelength band: 1625 to 1675 nm).

Broadly, WDM applications may be distinguished between coarse WDM (CWDM) and dense WDM (DWDM). By way of example, spectral grids for WDM applications are provided in International Telecommunication Union, ITU-T G.694.1. Generally, CWDM is applied in the O-band, referring to WDM systems with fewer than eight active wavelengths per fiber. Fiber transmission within the O-band experience a relatively high fiber attenuation, lending CWDM to short-range communications, with relatively wide-range frequencies having wavelengths that are spread far apart. Alternatively, DWDM is applied in the C and L-bands, which offer relatively low fiber attenuation, lending DWDM to longer-range communications, with tighter wavelength spacings to accommodate more channels onto a single fiber.

BRIEF DESCRIPTION OF THE DRAWINGS

Reference will now be made to the accompanying drawings, which are not necessarily drawn to scale, and wherein.

DETAILED DESCRIPTION

Figure 1:
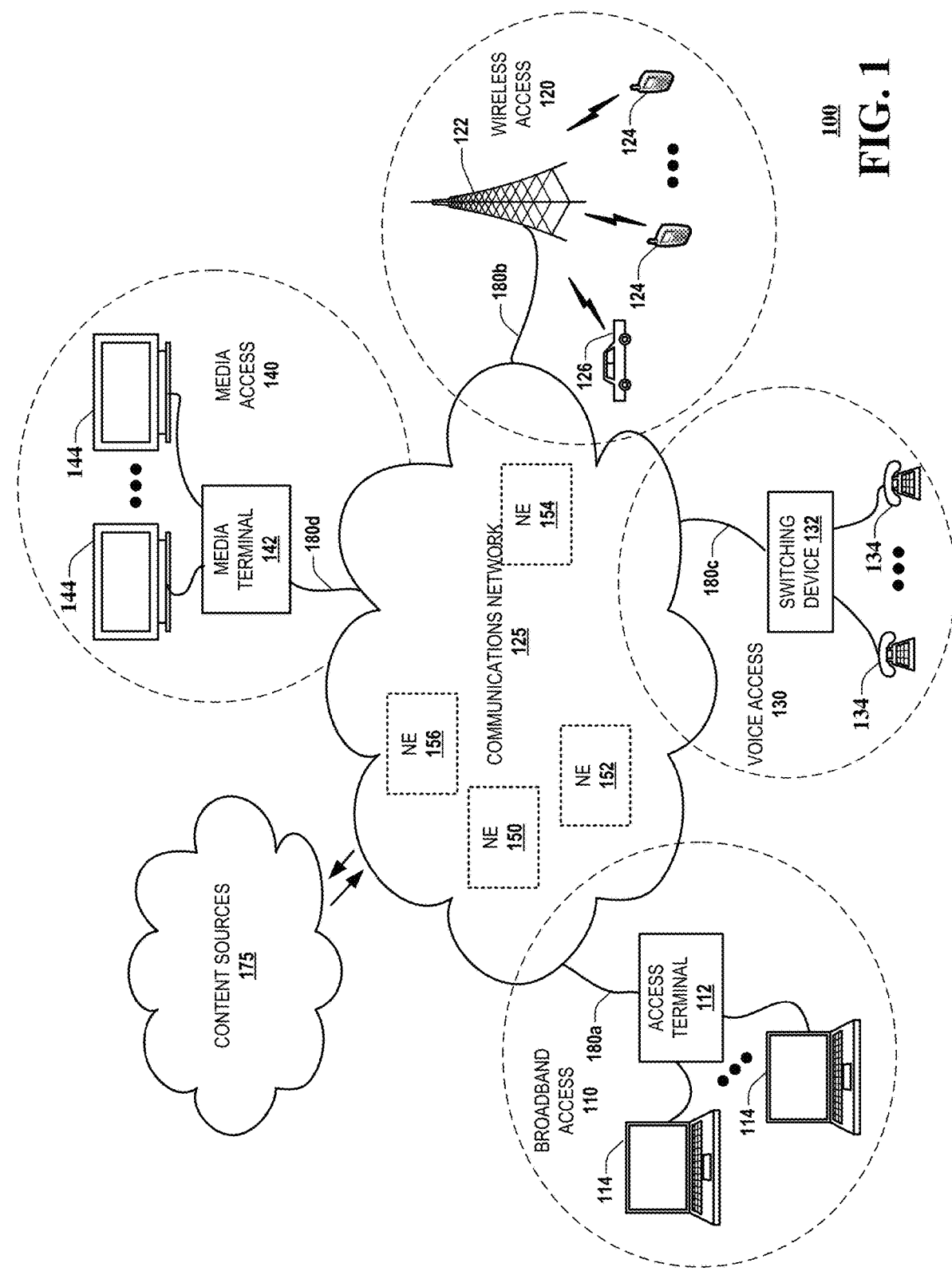
FIG. 1 is a block diagram illustrating an exemplary, non-limiting embodiment of a communications network in accordance with various aspects described herein.

The subject disclosure describes, among other things, illustrative embodiments for an optical terminal assembly including a housing with optical ports connectable to outside optical fibers and at least one passive, optical processing module. The passive, optical processing module may be configured external to the housing, then inserted into the housing to function alone and/or in combination with another optical processing module to passively process optical signals received by at least one of the optical ports. Processing of the optical signals may include, without limitation, filtering of a received optical signal to produce a filtered optical signal having a preferred arrangement of pass bands and/or stop bands. The filtering performance may be modified, e.g., selecting other pass and/or stop bands, by simply removing and replacing an optical processing module at the housing, without requiring specialized skills or tooling. Other embodiments are described in the subject disclosure.

One or more aspects of the subject disclosure include optical terminal assembly, which includes a housing defining an interior region. The housing includes a first waveguide port and a second waveguide port, wherein the first waveguide port is configured for receiving a first optical signal via a first optical waveguide optically coupled to the first waveguide port, and the second waveguide port is configured for providing a second optical signal to a second optical waveguide optically coupled to the second waveguide port. The optical terminal assembly further includes a first optical coupler located within the interior region of the housing and in optical communication with the first waveguide port and a second optical coupler also located within the interior region of the housing and in optical communication with the second waveguide port. A passive optical processing module is removably coupled to the first and second optical couplers and configured to perform a prescribed function upon the first optical signal to obtain the second optical signal without utilizing an electronic circuit.

One or more aspects of the subject disclosure include a process that includes receiving an optical signal at a first optical waveguide port of a housing of an optical terminal assembly defining an interior region, the optical signal received from an optical source external to the housing. The process further includes removably coupling a passive optical processing module to the interior region of the housing. The passive optical processing module is configured to perform a prescribed function upon the optical signal. The process further includes coupling the optical signal from the first optical waveguide port to the passive optical processing module and processing the optical signal according to the prescribed function to obtain a processed optical signal. The processed optical signal is directed to a second optical waveguide port of the housing of the optical terminal assembly, which permits the second optical waveguide port to transfer the processed optical signal to an optical waveguide external to the housing.

One or more aspects of the subject disclosure include an assembly that includes a housing having a first waveguide port and a second waveguide port. The first waveguide port is configured for receiving an optical signal via a first optical waveguide optically coupled to the first waveguide port. The assembly further includes a passive optical processing module that is removably coupled to the housing and optically coupled to the first waveguide port. The passive optical processing module is configured to perform a prescribed function upon the optical signal to obtain a processed optical signal without utilizing an electronic circuit; wherein the second waveguide port is configured to transfer the processed optical signal to an optical waveguide external to the housing.

Aspects of the subject disclosure may include, for example, a housing that includes a first waveguide port and a second waveguide port, wherein the first waveguide port is configured for receiving an optical signal via a first optical waveguide optically coupled to the first waveguide port. The housing may include a passive optical processing module that is removably coupled to the housing and optically coupled to the first waveguide port. The passive optical processing module is configured to perform a prescribed function, e.g., filtering, upon the optical signal to obtain a processed optical signal without utilizing an electronic circuit. The second waveguide port is configured to transfer the processed optical signal to an optical waveguide external to the housing. Other embodiments are disclosed.

WDM multiplexers use filters to pass wavelengths. The multiplexers and/or filter devices have form factors with surface areas dictated by number of fibers and/or mounting approach. The filters are static devices that allow bandpassing of selected wavelengths according to a fixed filtering arrangement. Namely, the filter devices are built, spliced into optical fibers, and deployed. Any changes to a deployed optical fiber filter arrangement, would require re-engineering a new filter device, un-splicing of a deployed device and re-splicing of the new device. Thus, any modifications would require special skill and/or specialized tooling in design, fabrication and/or deployment.

The techniques disclosed herein offer an alternative solution in which an optical fiber filter device includes a deployable housing configured to engage a removeable and replaceable filter module. The filter module may be designed and fabricated according to a specified optical spectrum arrangement and provided with one or more optical connector elements configured to engage complementary optical connector elements of the housing. The optical fiber filter device, including an interconnected filter module, introduces a specified spectral performance into an optical fiber link. The specified spectral performance may be modified by simply swapping out one optical filter module with another, without disturbing integration of the housing into the optical fiber link.

Referring now to FIG. 1, a block diagram is shown illustrating an example, non-limiting embodiment of a system 100 in accordance with various aspects described herein. For example, system 100 can include one or more optical terminal assemblies providing a housing that includes a first waveguide port and a second waveguide port, wherein the first waveguide port is configured for receiving an optical signal via a first optical waveguide optically coupled to the first waveguide port. The housing may include a passive optical processing module that is removably coupled to the housing and optically coupled to the first waveguide port. The passive optical processing module may be configured to perform a prescribed function, e.g., optical filtering of the optical signal to obtain a processed optical signal without utilizing an electronic circuit. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, a first communication infrastructure between a network element 156 of the communications network 125 and the broadband access terminal 112 may include an optical fiber link 180*a* that may include a reconfigurable optical coupling device adapted to implement a pre-programmed intelligence to a processing of optical signals conveyed by the optical fiber link 180*a*. Likewise, a second communication infrastructure between a network element 156 of the communications network 125 and equipment of the wireless access domain 120 may include an optical fiber link 180*b* that may include a reconfigurable optical coupling device adapted to implement a pre-programmed intelligence to a processing of optical signals conveyed by the optical fiber link 180*b*. Similarly, a third communication infrastructure between a network element 156 of the communications network 125 and equipment of the voice access domain 130 may include an optical fiber link 180*c* that may include a reconfigurable optical coupling device adapted to implement a pre-programmed intelligence to a processing of optical signals conveyed by the optical fiber link 180*c*. In at least some embodiments, the example system 100 includes a third communication infrastructure between a network element 156 of the communications network 125 and equipment of the media access domain 140 may include an optical fiber link 180*d* that may include a reconfigurable optical coupling device adapted to implement a pre-programmed intelligence to a processing of optical signals conveyed by the optical fiber link 180*d*.

Figure 2:
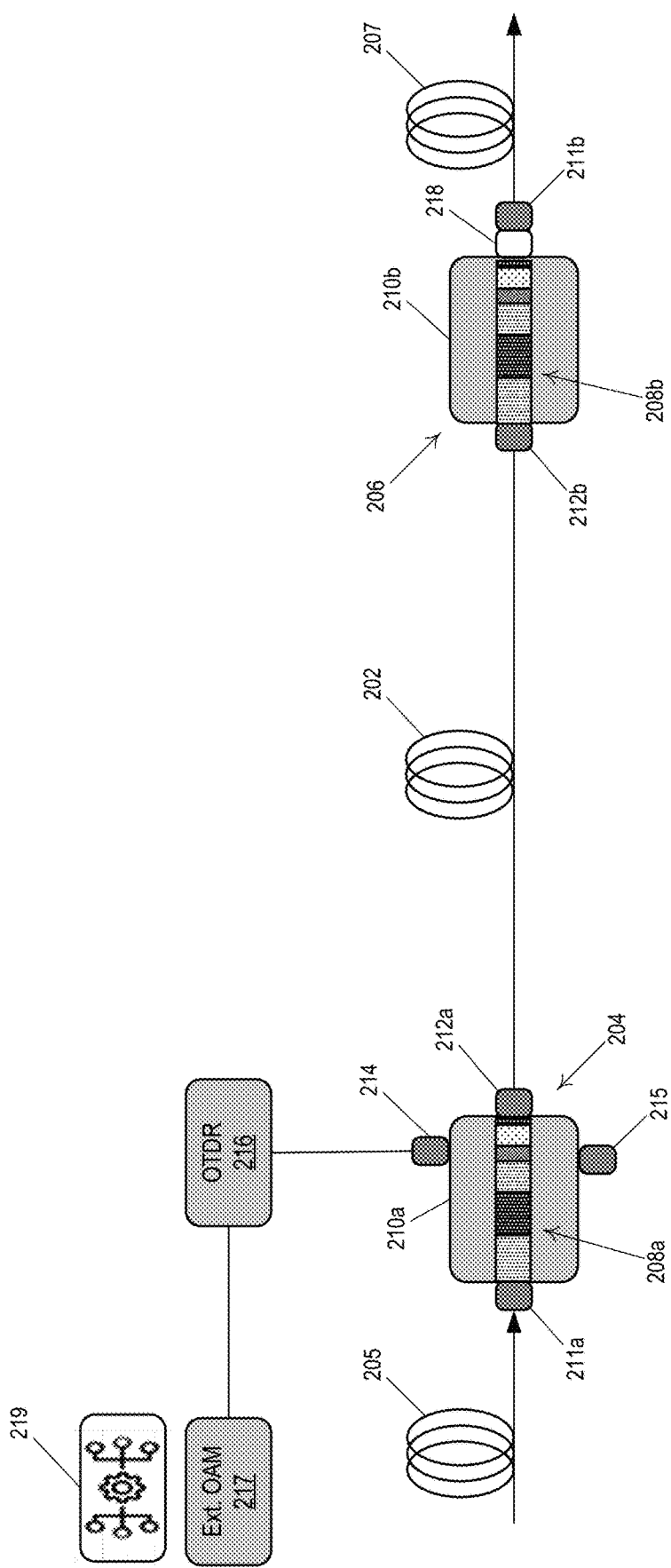
FIG. 2 is a block diagram illustrating an example, non-limiting embodiment of a passive optical network (PON) functioning within the communication network of FIG. 1 in accordance with various aspects described herein.

FIG. 2 is a block diagram illustrating an example, non-limiting embodiment of a reconfigurable passive optical network (PON) 200 functioning within the system 100 of FIG. 1 in accordance with various aspects described herein. The reconfigurable PON 200 includes an optical waveguide extending between two particular physical locations. For example, the optical waveguide may include an optical fiber 202 extending between a first location, such as a central office, sometimes referred to as a headend, point of presence or data center of a communication service provider, and a second location, remote from the central office. In some applications the remote location may refer to a neighborhood including subscribers to be serviced via the optical fiber 202. Alternatively, or in addition, the remote location may refer to a location of a business, a school, and/or a government agency. In at least some instances, the remote location may include a separate network, such as a remote local area network (LAN), and/or a wireless communication network, such as a mobile cellular provider network, e.g., a core network and/or a radio access network of a 4G and/or 5G wireless network.

The example optical fiber 202 provides a broadband optical channel subject to physical properties of the optical fiber 202 and/or any terminations, e.g., connectors, splices and/or fiber amplifiers. For example, physical properties may include, without limitation, a type of glass and/or construction, e.g., a multimode fiber, a single-mode fiber, a core diameter, a cladding configuration, and the like. Examples of other physical properties of the optical fiber 202 include an attenuation profile, a dispersion profile, a polarization dispersion profile, and so on.

The example reconfigurable optical network (PON) 200 includes a first terminal assembly 204 at the communication service provider and a second terminal assembly 206 at the client end. According to the illustrative example, the first terminal assembly 204 is coupled between a first optical fiber 205 and a first end of the optical fiber 202 present at the first location. Likewise, the second terminal assembly 206 is coupled between a second optical fiber 207 and a second end of the optical fiber 202 present at the second location. An opposing end of the first optical fiber 205 may be in optical communication with a communication service provider device, such as an optical line terminal (not shown), whereas an opposing end of the second optical fiber 207 may be in optical communication with one or more client devices, such as optical network terminals (not shown).

The first and second terminal assemblies 204, 206 may be passive devices, without any onboard processing and/or electronic control features. In at least some embodiments, the terminal assemblies 204, 206 are all passive, including little more than optical fiber and/or other optical, or glass, including treated glass, e.g., coated glass elements coupled together. For example, the terminal assemblies 204, 206 may be static, providing optical waveguides and/or optical processing devices, such as filters, mirrors, signal splitters and/or combiners, and/or other slow-wave structures. Although they are passive, at least one of the first and second terminal assemblies 204, 206 may be reconfigurable from one static configuration to another. For example, one of the first terminal assembly 204, the second terminal assembly 206 or both, may include a removeable and replaceable first and second optical processing modules 208a, 208b, generally 208, such that one of a number of different optical processing modules 208 may be selected and applied to one or both terminal assemblies 204, 206. An application of a respective optical processing module 208a, 208b to each of the first and second terminal assemblies 204, 206 may include, without limitation, a connectorized optical processing module 208 that may be removed and/or replaced.

Providing optical processing to one or more of the terminal assemblies 204, 206 according to the example modular approach, provides at least some degree of programmability and/or flexibility to change and/or adapt a PON as may be advantageous to a particular application. Such flexibility may be beneficial by allowing a deployed PON to adapt to future optical communication applications and/or technologies. In at least some sense, the ability to select one or more processing steps, to obtain one or more modules configured to implement the processing stems, and to incorporate these modules into one or more of the terminal assemblies 204, 206 can be characterized as pre-programmed intelligence. Namely, each of the terminal assemblies 204, 206 may be programmed to perform a respective optical processing function according to the respective, included optical processing module 208a, 208b.

In at least some embodiments, the optical processing modules 208 operate on optical signals transported by the optical fiber 202, without necessarily requiring insight into the content, format and/or technologies of the processed lightwave communication signals. Merely, any light presented to the processing modules 208 will be processed according to the preprogrammed, static configuration of the processing modules 208. Without limitation, optical processing may include any combination of one or more of power splitting, power combining, reflection, refraction, diffraction, polarization, filtering. Filtering may include any combination of one or more of high-pass filtering, low-bas filtering and/or bandpass filtering. In at least some applications the optical processing may include attenuation and/or amplification of the lightwave signals.

Preferably, the optical processing modules 208 are configured to be easily removed and/or replaced by an operator, and/or the end consumer, without requiring special skills and/or specialized equipment. For example, the first terminal assembly 204 includes a first terminal housing 210a, the first optical processing module 208a, an equipment fiber port 211a, and a common fiber port 212a. In some embodiments, one or more of the equipment fiber port 211a and the common fiber port 212a may include an optical fiber connector, e.g., a bulkhead style connecter mounted to the first terminal housing 210a, and/or a fiber pigtail that may extend through the first terminal housing 210a, for some suitable length to accommodate a splice to another optical fiber waveguide, e.g., the first optical fiber 205. In at least some embodiments, the optical processing module 208a includes first and second optical ports. For example, the first optical port of the first optical processing module 208a is optically coupled to the equipment fiber port 211a, while the second optical port of the first processing module 208a is optically coupled to the common fiber port 212a. It is understood that a lightwave signal applied to one of the first and second optical ports of the first optical processing module 208a, is processed by the first optical processing module 208a to produce a first processed lightwave signal at another one of the first and second optical ports of the first optical processing module 208a. In some embodiments, the first optical processing module 208a applies a symmetrical process in which light provided at either end is processed in a similar manner. Alternatively, or in addition, the first optical processing module 208a may apply an asymmetrical process in which light provided at one end is processed according to a first process, whereas light provided another end is processed according to a second process, the first and second processes differing in at least some capacity.

By way of example, the second terminal assembly 206 includes a second terminal housing 210b, the second optical processing module 208b, an equipment fiber port 211b, a common fiber port 212b. In some embodiments, one or more of the equipment fiber port 211b and the common fiber port 212b may include an optical fiber connector, e.g., a bulkhead style connecter mounted to the second terminal housing 210b, and/or a fiber pigtail that may extend through the second terminal housing 210b and perhaps for some suitable length to permit splicing with another optical fiber waveguide, e.g., the second optical fiber 207. In at least some embodiments, the equipment fiber port 211b is optically coupled to a first optical port of the second optical processing module 208b, and the common fiber port 212b is optically coupled to a second optical port of the second optical processing module 208b. It is understood that a lightwave signal applied to one of the first and second ports of the second optical processing module 208b, is processed by the second optical processing module 208b to produce a second processed lightwave signal at another one of the first and second ports of the second optical processing module 208b. In some embodiments, the second optical processing module 208b applies a symmetrical process in which light provided at either end is processed in a similar manner. Alternatively, or in addition, the second optical processing module 208b may apply an asymmetrical process in which light provided at one end is processed according to a first process, whereas light provided at another end is processed according to a second process, the first and second processes differing in at least some capacity.

In at least some applications, the first and second optical processing modules 208a, 208b apply virtually the same processing. For example, the first optical processing module 208a may be configured to filter one or more of the bands and/or sub-bands of the optical fiber spectrum. In this configuration, with matched filters, a spectral utilization of the optical fiber 202 may be limited to those bands and/or sub-bands selected by the filtering process. It is understood that eliminating filtered portions of the optical fiber spectrum may reserve utilization of those filtered portions to other users and/or other applications, including future applications as may be beneficial to adopt later-developed technologies with a deployed reconfigurable PON 200. Alternatively, or in addition, a limiting utilization to unfiltered portions of a broader optical fiber spectrum may offer other benefits as may be realized by reduced noise, interference, dispersion and/or attenuation.

The example first terminal assembly 204 includes an operation, administration and maintenance (OAM) port 214. The OAM port 214 may be in optical communication with one or more of the equipment fiber port 211a or the common fiber port 212a. For example, the OAM port 214 may be coupled to an optical network test system, such as an optical time domain reflectometer (OTDR) 216. The OTDR 216 may generate an optical test signal that is injected into the first terminal assembly 204 via the OAM port 214. According to optical signal routing within the first terminal assembly 204, the optical test signal may be routed to the common fiber port 212a and injected into a headend of the optical fiber 202. The test signal may travel down the optical fiber 202 from the headend toward the client end and into the common fiber port 212b of the second terminal assembly 206. In at least some embodiments, the test signal may be injected into the second optical processing module 208b, e.g., along with another optical signal as may originated at the headend, being processed by the first optical processing module 208a and traversed the same optical fiber 202.

In at least some embodiments, the test signal may be distinguished from other optical signals according to its wavelength. A reflective device 218 may be provided at, within and/or nearby to the second optical processing module 208b. According to the illustrative embodiment, the reflective device 218 is provided at a client-facing end of the second optical processing module 208b, e.g., adjacent to and/or incorporated into the equipment fiber port 211b. It is understood that the reflective device 218 may include a frequency selectivity that reflects wavelength band used by the test signal, while passing other wavelength bands.

The OTDR 216 is adapted to detect reflections from the test signal and based on a measured delay, identify a distance value associated with the reflection. In at least some embodiments, the OTDR 216 may further identify a magnitude of the reflection and/or attenuation loss along the optical path traversed by the test signal. The OTDR 216 may be further coupled to an external OAM system 217 that may be configured to generate a test and/or evaluation plan for observing a performance of the reconfigurable PON 200. To that end, the external OAM system 217 may be in further communication with one or more analytic appliances for testing, e.g., acceptance testing, and/or monitoring.

In at least some embodiments, OAM test signals may be restricted to a particular region of the optical spectrum, e.g., an OAM wavelength band. For example, considering the optical fiber bands prescribed by ITU-T G.694.1, OAM test signals may be limited to one of the bands, or more likely to a subregion of one of the bands. According to the illustrative examples discussed herein, an upper region of the L band, e.g., between about 1650-1665 nm may be reserved for OAM activity. At least one advantage of using an allocated band, or sub-band, is that OAM measurements will be more readily comparable, without requiring extra steps of accounting for fiber channel differences as might otherwise be encountered in attenuation and/or dispersion. In at least some embodiments, the optical processing modules 208a, 208b may be equipped with an OAM port and/or OAM signal processing features configured for the predetermined OAM operational band.

It is envisioned that in at least some embodiments, one or more of the first and second terminal assemblies 204, 206 may be equipped with a separate fiber monitor port. According to the illustrative example, the first terminal assembly 204 includes a signal splitter, e.g., a 90:10 split. The monitor port 215 is configured to impose a defined split ratio from one input fiber to two output fibers. For example, the fiber monitor port 215 may receive a prescribed sampling ratio of a processed optical signal, e.g., 10%, while the common fiber port 212a receives the remaining portion of the processed optical signal, e.g., 90%. The sampling port may be used to monitor performance of the first optical processing module, e.g., provided to the external OAM system 217 and/or analytical appliance 219 for test and/or monitoring. It is envisioned that one or more of the various optical couplers and/or connectors may include an angled physical contact (APC) connector to reduce unwanted reflections as might result from the connector.

Figure 3:
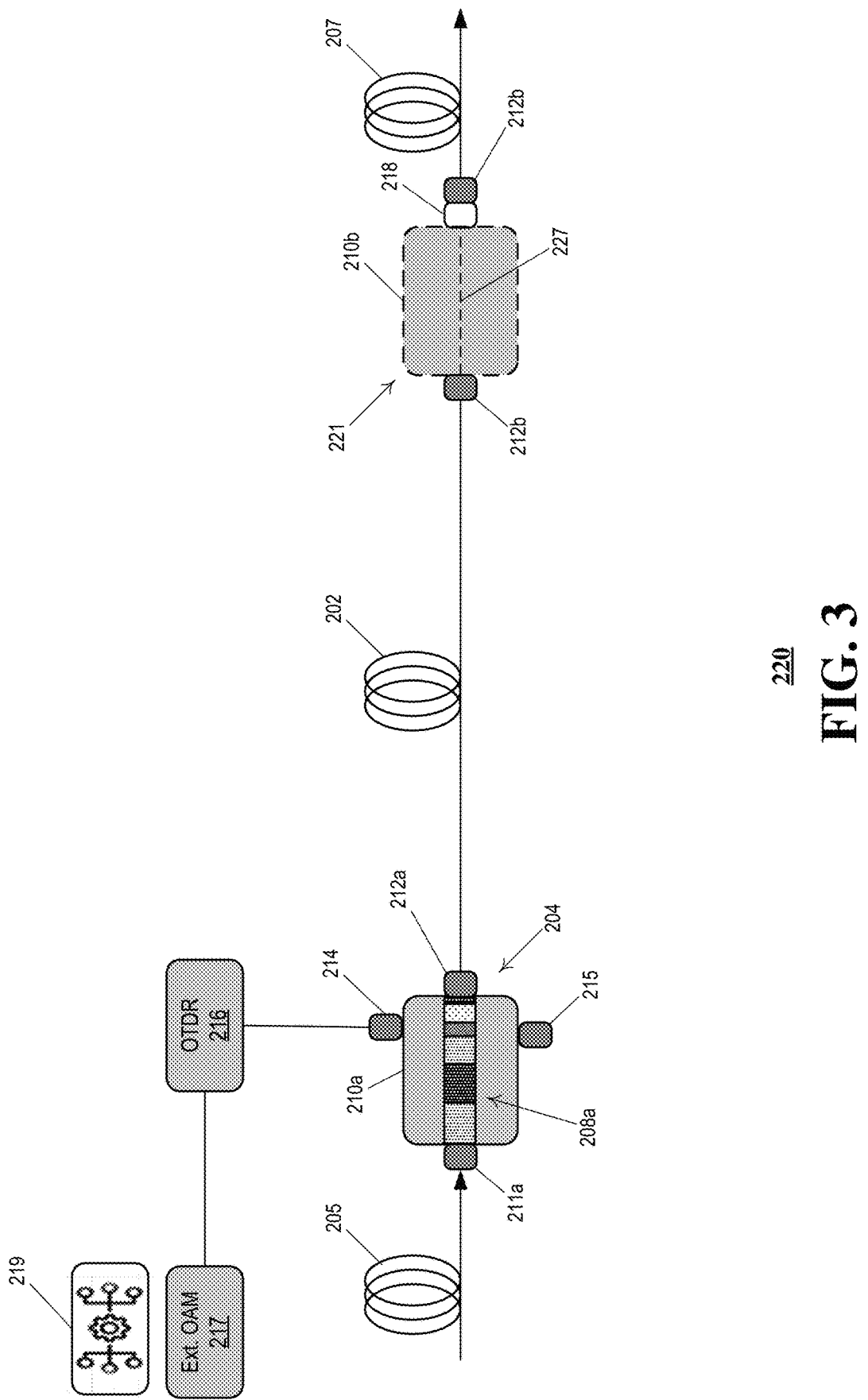
FIG. 3 is a block diagram illustrating another example, non-limiting embodiment of PON functioning within the communication network of FIG. 1 in accordance with various aspects described herein.

FIG. 3 is a block diagram illustrating another example, non-limiting embodiment of a reconfigurable PON 220 functioning within the system 100 of FIG. 1 in accordance with various aspects described herein. The example reconfigurable PON 220 includes a first terminal assembly 204, which includes a first optical processing module 208a. The first optical processing module 208a may be adapted to process optical signals received from the first optical fiber 205 to obtain processed signals that may be injected into a proximal end of the optical fiber 202. In contrast to the previous example, however, the reconfigurable PON 220 may not include a second terminal assembly 221. For example, a distal end of the optical fiber 202 that would have connected to the second terminal assembly 221 may be directly coupled to the second optical fiber 207, e.g., via a connector and/or a splice.

Alternatively, the reconfigurable PON 220 may include the second terminal assembly 221 configured to effectively pass through a signal received on a common fiber port 212b to an equipment fiber port 211b, coupled to the second optical fiber 207. In some embodiments, a second terminal assembly 221 configured for pass-through may include an optical waveguide 227 interconnected between the common fiber port 212b and the equipment fiber port 211b. In other embodiments, the second terminal assembly 221 may include a second optical processing module 208b (FIG. 2) that is configured to provide a pass-through function, e.g., without necessarily restricting any portion of an optical spectrum of the optical fiber 202. In either configuration, the second terminal assembly 221 may be configured with one or more of the reflective device 218, an OAM port and/or a specified ratio splitter, providing a sample of the optical signal to a fiber monitor port.

Figure 4:
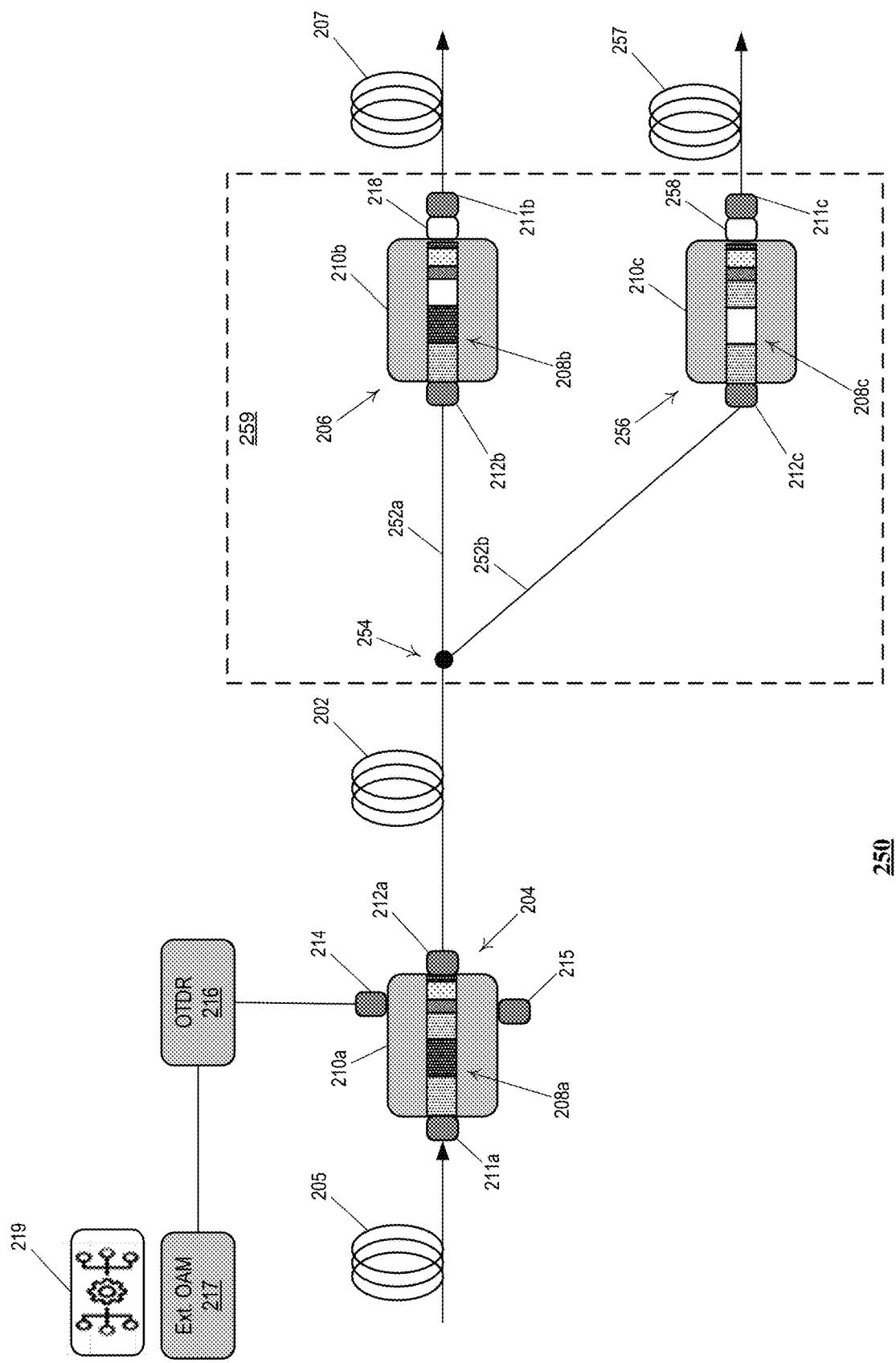
FIG. 4 is a block diagram illustrating yet another example, non-limiting embodiment of PON functioning within the communication network of FIG. 1 in accordance with various aspects described herein.

FIG. 4 is a block diagram illustrating yet another example, non-limiting embodiment of a reconfigurable PON 250 functioning within the system 100 of FIG. 1 in accordance with various aspects described herein. The example reconfigurable PON 250 includes a first terminal assembly 204, which includes a first optical processing module 208a. The first optical processing module 208a may be adapted to process optical signals received from the first optical fiber 205 to obtain processed signals that may be injected into a proximal end of the optical fiber 202. The reconfigurable PON 250 may include an optical signal divider configured to generate some specified number, N, of division of an optical signal received from the first terminal assembly 204. An optical signal divider producing N optical signal divisions may be referred to as a 1×N optical splitting device. The illustrative example reconfigurable PON 250 includes a 1×2 optical splitting device 254. The optical splitting device 254 may be configured to power divide an optical input according to a predetermined number and/or ratio. For example, optical power received from the first terminal assembly 204 may be split in half, with approximately half the received optical power provided to each of two distal optical fiber segments 252a, 252b.

It is understood that in at least some embodiments the divisions may be obtained in layers, e.g., according to an interconnected cascaded arrangement of other optical splitting devices, such as 1×M optical splitters, where M<N. For example, 1×4 optical signal splitter device may be obtained by coupling three 1×2 optical signal splitter devices according to a two-layer cascaded arrangement.

According to the illustrative example, a first optical signal division is coupled from the optical splitting device 254 to a second terminal assembly 206 via a first distal optical fiber segment 252a. Likewise, a second optical signal division is coupled from the optical splitting device 254 to a third terminal assembly 256 via a second distal optical fiber segment 252a. The second terminal assembly 206 includes a second housing 210b containing a removable, passive optical processing module 208b. The second terminal assembly 206 includes a common fiber port 212b optically coupled to the first distal optical fiber segment 252a and an equipment fiber port 211b coupled to a second optical fiber 207. The removeable, passive optical processing module 208b is optically coupled between the common fiber port 212b and the equipment fiber port 211b. In at least some embodiments, the second terminal assembly 206 includes a reflective device 218 adapted to reflect at least a portion of an incident OAM signal back towards an OTDR 216.

The third terminal assembly 256 includes a third terminal housing 210c containing a removable, passive optical processing module 208c. The third terminal assembly 256 includes a common fiber port 212c optically coupled to the second distal optical fiber segment 252b and an equipment fiber port 211c coupled to a third optical fiber 257. The removeable, passive optical processing module 208c is optically coupled between the common fiber port 212c and the equipment fiber port 211c. In at least some embodiments, the third terminal assembly 256 includes a reflective device 258 adapted to reflect at least a portion of an incident OAM signal back towards an OTDR 216. In some embodiments, the same OAM signal is reflected back by both reflective devices 218, 258.

It is envisioned that in at least some configurations the reflected OAM signals may be distinguishable, e.g., to facilitate distinguishing between the different reflections from a perspective of the OTDR 216 and/or an external OAM system 217. For example, the reflective devices 218, 258 may include and/or be combined with polarization filters, such that a first incident test signal at a first polarization is returned via the first reflective device 218 and returned to the OTDR 216, whereas the incident test signal at the first polarization is not returned via the second reflective device 258. Similarly, a second incident test signal at a second polarization is returned via the second reflective device 258 and returned to the OTDR 216, whereas the incident test signal at the second polarization is not returned via the first reflective device 218. In at least some embodiments, the OTDR 216 may include and/or be combined with at least one polarization filter adapted to generate test signals according to the first and/or the second polarizations. In at least some embodiments, the polarizations may be orthogonal.

It is understood that a reconfigurable PON 250 including an optical signal splitter may be configured to produce any number of divided signals, at least some of which may be directed to respective terminal assemblies that may be configured with respective optical processing modules. In at least some embodiments, the optical processing modules may be configured to perform independent processing to obtain distinguishable processed output signals. Alternatively, or in addition, at least some of the optical processing modules may be configured to perform the same processing to obtain similar and/or identical processed output signals.

In at least some embodiments, one or more of a group of terminal assemblies configured to receive respective optical signal divisions may be housed in physically separate housing units that may be collocated and/or dispersed at different physical locations. Alternatively, or in addition, at least some of the group of terminal assemblies configured to receive respective optical signal divisions may be contained within a common housing 259 (shown in phantom). Namely, a single housing may include more than one removeable optical processing modules that may be optically coupled to respective outputs of the optical signal splitter.

Figure 5:
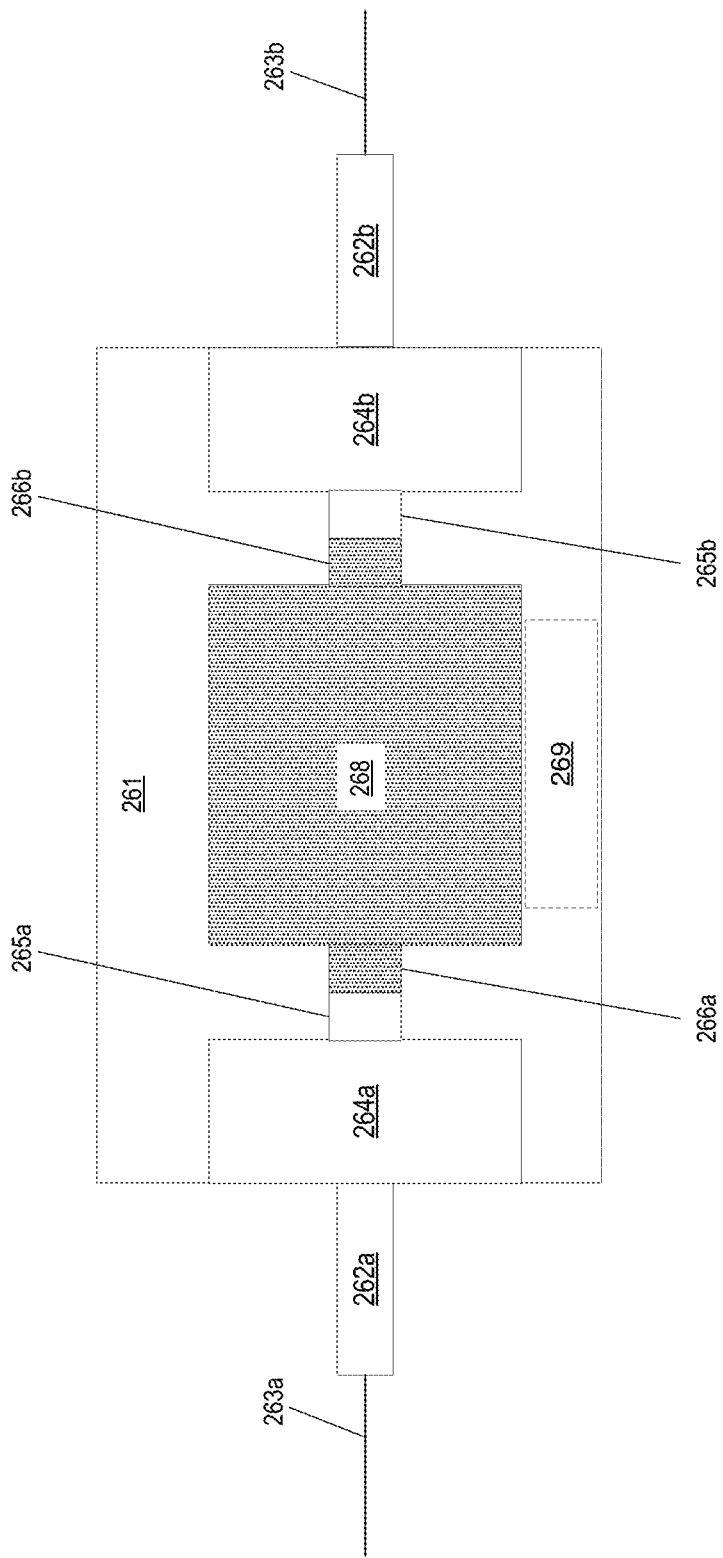
FIG. 5 is a block diagram illustrating an example, non-limiting embodiment of a reconfigurable optical filter functioning within the PONs of FIG. 2 through FIG. 4 and the communication network of FIG. 1 in accordance with various aspects described herein.

FIG. 5 is a block diagram illustrating an example, non-limiting embodiment of a reconfigurable optical filter assembly 260 functioning within the reconfigurable PONs 200, 220, 250 of FIG. 2 through FIG. 4 and the system 100 of FIG. 1 in accordance with various aspects described herein. The reconfigurable optical filter assembly 260 includes a housing 261 configured with a first optical port 262a coupled to a first optical fiber 263a and a second optical port 262b coupled to a second optical fiber 263b. The reconfigurable optical filter assembly 260 further includes a passive optical processing module 268, a first optical distribution network 264a and a second optical distribution network 264b.

The first optical distribution network 264a is optically coupled between the first optical port 262a and the passive optical processing module 268. Likewise, the second optical distribution network 264b is coupled between the second optical port 262b and the passive optical processing module 268. In at least some embodiments, one or both of the first and second optical distribution networks 264a, 264b may be coupled to the passive optical processing module 268 by an optical connector.

According to the illustrative example, a first end of the first optical distribution network 264a is optically coupled to the first optical port 262a, while a second end of the first optical distribution network 264a is optically coupled to a first housing connector portion 265a. A first end of the passive optical processing module 268 is optically coupled to a first module connector portion 266a. The first housing connector portion 265a is configured to engage the first module connector portion 266a to form a low-loss optical path or channel therebetween. The interconnection and resulting low-loss optical path allow optical signals to pass between the first optical distribution network 264a and the passive optical processing module 268. In more detail, engagement of the housing connector portion 265a and the module connector portion 266a may include a mechanical fastening arrangement configured to reliably maintain the low-loss optical path or channel while fastened together.

Similarly, a first end of the second optical distribution network 264b is optically coupled to the second optical port 262b, while a second end of the second optical distribution network 264b is optically coupled to a second housing connector portion 265b. A second end of the passive optical processing module 268 is optically coupled to a second module connector portion 266b. The second housing connector portion 265b and the second module connector portion 266b are configured to engage each other to form a low-loss optical path or channel therebetween, allowing optical signals to pass between the second optical distribution network 264b and the passive optical processing module 268. In more detail, engagement of the other second housing connector portions 265b and the second module connector portion 266b may also include a mechanical fastening arrangement configured to reliably maintain the low-loss optical path or channel while fastened together.

In at least some embodiments, an interconnecting and/or mating together of the first housing connector portions 265a and the first module connector portion 266a may be followed by a disconnecting and/or un-mating of the first connector portions 265a, 266a. Preferably, the disconnecting and/or un-mating may be once again followed by a mating of the first connector portions 265a, 266a, in what may be referred to as a make-and-break interconnection. Ideally, the low-loss optical path may be re-established upon any subsequent engagement and/or mating of the first connector portions 265a, 266a.

By way of example, the first optical distribution network 264a may include an optical waveguide between the first optical port 262a and the passive optical module 268 via an interconnection of the first connector portions 265a, 266a. The optical waveguide may include an optical fiber and/or an optical waveguide formed upon a substrate, such as a semiconductor device. Similarly, the second optical distribution network 264b may include an optical waveguide between the second optical port 262b and the passive optical processing module 268 via an interconnection of the second connector portions 265b, 266b. Once again, the optical waveguide may include an optical fiber and/or an optical waveguide formed upon a substrate, such as a semiconductor device.

Although the first and second module connector portions 266a, 266b are illustrated as being positioned on opposite ends or sides of the passive optical processing module 268, it is understood they may be located elsewhere on the passive optical processing module 268. For example, the first and second module connector portions 266a, 266b may be located upon a common surface of the passive optical processing module 268. Consider a rectangular form factor of the passive optical processing module 268 defining six surfaces. It is envisioned that in at least some embodiments, both of the first and second module connector portions 266a, 266b may be positioned along the same surface. In at least some embodiments, the connectorized surface may represent a surface that may engage the reciprocal first and second housing connector portions 265a, 265b during an insertion process, whereby the passive optical processing module is inserted into the housing 261. Such connections may include what are commonly referred to as blind-mate connections. In this regard, the housing 261, the passive optical processing module and/or a mounting structure 269 fixedly attached to the housing may include a guiding element, such as guide pins adapted to engage reciprocal sockets during engagement to ensure proper alignment during interconnects.

By way of example, commercially available optical connectors that offer make-and-break technology include, without limitation: (i) standardized connection-standard SC/LC connection on back; (ii) Lucent Connector (LC) having a form factor category of terminations offering relatively small 1.25 mm ferrules; (iii) Standard Connector (SC), which use push-and-pull motion to secure the connector, also having 2.5 mm ferrules; (iv) ST connector also having 2.5 mm ferrules; (v) Ferrule Core (FC) connector using a keyed, screw-in type ferrule that prevents the connection from interruptions; (vi) Multi-Position Optical (MPO) connectors, e.g., to connect ribbon cables with multiple optical fibers, whereby connections between ferrules may use pins and holes to mate the ends of the fiber with another cable or an electronic device; and/or (vii) MT-RJ connectors.

Figure 6:
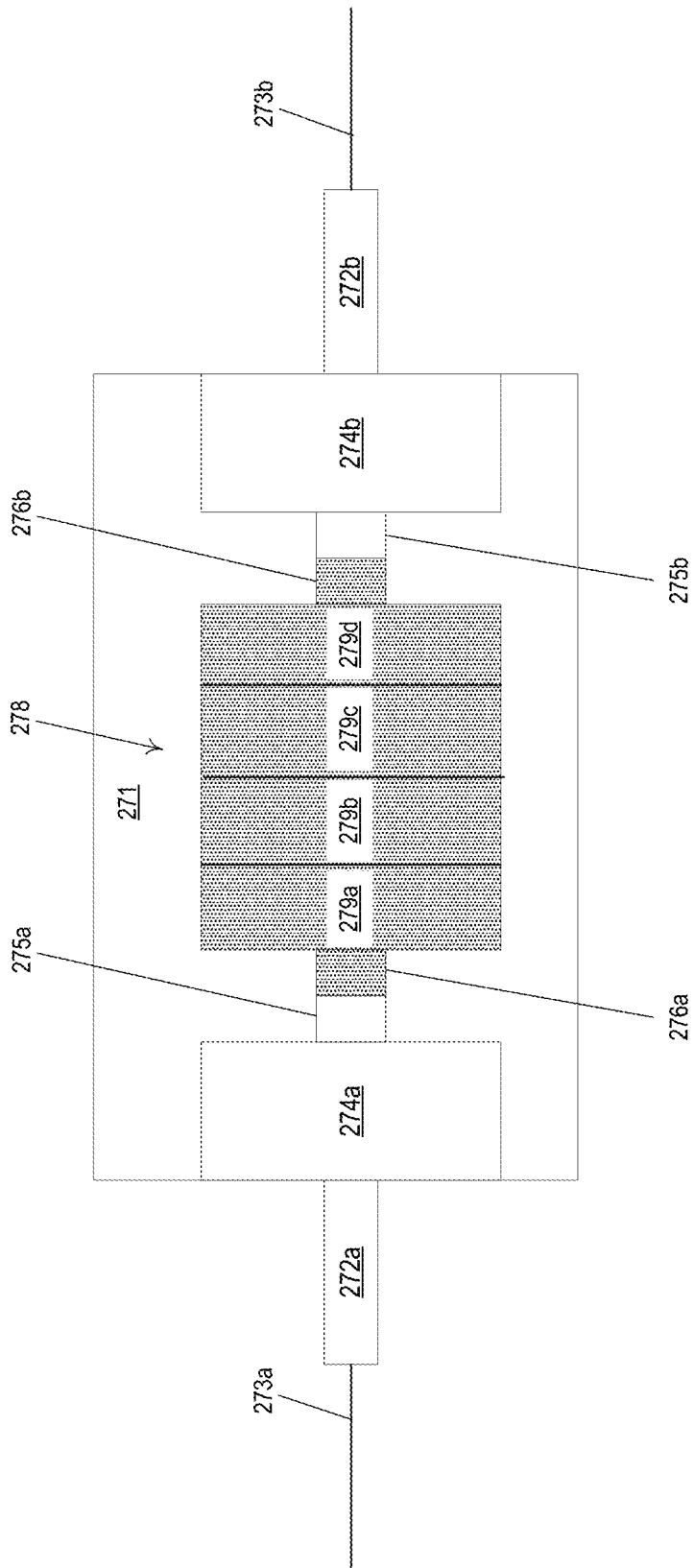
FIG. 6 is a block diagram illustrating another example, non-limiting embodiment of a reconfigurable optical filter functioning within the PONs of FIG. 2 through FIG. 4 and the communication network of FIG. 1 in accordance with various aspects described herein.

FIG. 6 is a block diagram illustrating another example, non-limiting embodiment of a reconfigurable optical filter assembly 270 functioning within the reconfigurable PONs 200, 220, 250 of FIG. 2 through FIG. 4 and the system 100 of FIG. 1 in accordance with various aspects described herein. The reconfigurable optical filter 270 includes a housing 271 configured with a first optical port 272a coupled to a first optical fiber 273a and a second optical port 272b coupled to a second optical fiber 273b. The reconfigurable optical filter assembly 270 further includes a passive optical processing module 278, a first optical distribution network 274a and a second optical distribution network 274b.

The first optical distribution network 274a is optically coupled between the first optical port 272a and the passive optical processing module 278. Likewise, the second optical distribution network 274b is coupled between the second optical port 272b and the passive optical processing module 278.

According to the illustrative example, a first end of the first optical distribution network 274a is optically coupled to the first optical port 272a, while a second end of the first optical distribution network 274a is optically coupled to a first housing connector portion 275a. A first end of the passive optical processing module 278 is optically coupled to a first module connector portion 276a. The first housing connector portion 275a is configured to engage the first module connector portion 276a to form a low-loss optical path or channel therebetween. The interconnection and resulting low-loss optical path allow optical signals to pass between the first optical distribution network 274a and the passive optical processing module 278.

Similarly, a first end of the second optical distribution network 274b is optically coupled to the second optical port 272b, while a second end of the second optical distribution network 274b is optically coupled to a second housing connector portion 275b. A second end of the passive optical processing module 278 is optically coupled to a second module connector portion 276b. The second housing connector portion 275b and the second module connector portion 276b are configured to engage each other to form a low-loss optical path or channel therebetween, allowing optical signals to pass between the second optical distribution network 264b and the passive optical processing module 278. It is understood that the first and second housing connector portions 275a, 275b and the first and second module connector portions 276a, 276b may include any of various examples disclosed herein and/or otherwise known by those familiar with optical communication systems.

According to the illustrative embodiments, the passive optical processing module 278 includes one or more optical processing elements 279a, 279b, 279c, 279d, generally 279. The optical processing elements 279 may be configured to be optically coupled between the first and second module connector portions 276a, 276b. For example, the processing elements may be configured in a series arrangement by which an optical signal entering one end of the passive optical processing module 278, passes, in turn, through each of the included optical processing elements 279, before exiting another end of the passive optical processing module 278.

Figure 7:
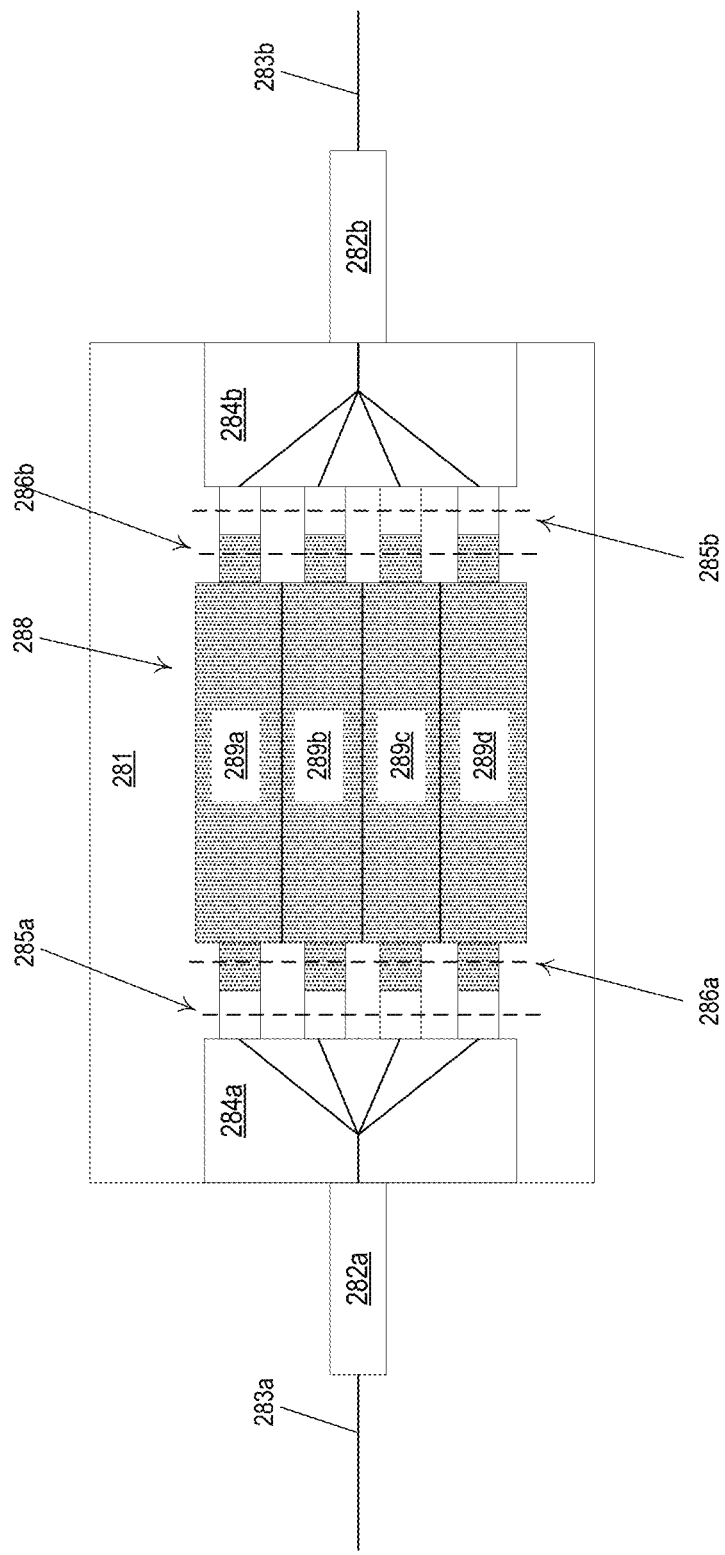
FIG. 7 is a block diagram illustrating another example, non-limiting embodiment of a reconfigurable optical filter functioning within the PONs of FIG. 2 through FIG. 4 and the communication network of FIG. 1 in accordance with various aspects described herein.

FIG. 7 is a block diagram illustrating yet another example, non-limiting embodiment of a reconfigurable optical filter assembly 280 functioning within the reconfigurable PONs 200, 220, 250 of FIG. 2 through FIG. 4 and the system 100 of FIG. 1 in accordance with various aspects described herein. The reconfigurable optical filter 280 includes a housing 281 configured with a first optical port 282a coupled to a first optical fiber 283a and a second optical port 282b coupled to a second optical fiber 283b. The reconfigurable optical filter assembly 280 further includes a passive optical processing module 288, a first optical distribution network 284a and a second optical distribution network 284b.

The first optical distribution network 284a is optically coupled between the first optical port 282a and the passive optical processing module 288. Likewise, the second optical distribution network 284b is coupled between the second optical port 282b and the passive optical processing module 288.

According to the illustrative example, a first end of the first optical distribution network 284a is optically coupled to the first optical port 282a, while a second end of the first optical distribution network 284a is optically coupled to a first housing connector portions 285a. A first end of the passive optical processing module 278 is optically coupled to a first module connector portion 286a. The first housing connector portion 285a is configured to engage the first module connector portion 286a to form a low-loss optical path or channel therebetween. The interconnection and resulting low-loss optical path allow optical signals to pass between the first optical distribution network 284a and the passive optical processing module 288.

Similarly, a first end of the second optical distribution network 284b is optically coupled to the second optical port 282b, while a second end of the second optical distribution network 284b is optically coupled to a second housing connector portion 285b. A second end of the passive optical processing module 288 is optically coupled to a second module connector portion 286b. The second housing connector portion 285b and the second module connector portion 286b are configured to engage each other to form a low-loss optical path or channel therebetween, allowing optical signals to pass between the second optical distribution network 284b and the passive optical processing module 288. It is understood that the first and second housing connector portions 285a, 285b and the first and second module connector portions 276a, 286b may include any of various examples disclosed herein and/or otherwise known by those familiar with optical communication systems.

According to the illustrative embodiments, the passive optical processing module 288 includes one or more optical processing elements 289a, 289b, 289c, 289d, generally 289. The optical processing elements 289 may be configured to be optically coupled between the first and second module connector portions 286a, 286b, e.g., using separate connector elements for each of the optical processing elements 289. For example, the optical processing elements 289 may be configured in a parallel arrangement by which an optical signal entering one end of the passive optical processing module 288, passes through each of the included optical processing elements 289, in parallel, e.g., contemporaneously, before exiting another end of the passive optical processing module 288.

According to the parallel arrangement, the first optical distribution network 284a includes a 1×4 optical signal or power splitter that directs a light signal received from the first optical fiber 283a into four divisions that are individually applied to each of the four example optical processing elements 289. Similarly, the second optical distribution network 284b includes a 4×1 optical signal or power combiner that combines the four separately processed divisions into a single combined, processed optical signal that is directed into the second optical fiber 283b. In at least some embodiments, one or more of the example reconfigurable optical filter assemblies 260, 270, 280 may be operated in a reciprocal manner, e.g., processing signals received at either port and providing processed signals at the other port. Alternatively, or in addition, at least some of the example reconfigurable optical filter assemblies 260, 270, 280 may process received light signals differently depend upon which port of the reconfigurable optical filter assemblies 260, 270, 280 received the optical signal.

In at least some embodiments, the individual processing elements 279, 289 may include a respective, passive optical processor contained within a respective housing or case. In such instances, the individual optical processing elements 279, 289 may be independently inserted and/or removed and/or rearranged, e.g., re-ordered. This arrangement allows the reconfigurable optical filter assemblies 260, 270, 280 to be reconfigured and/or otherwise reprogrammed in the field, without requiring any special skill and/or equipment. Simply access an interior region of the housing 261, 271, 281, then add, remove and/or replace one or more of the individual filter elements 279, 289.

It is envisioned that in at least some embodiments, the reconfigurable optical filter assemblies 260, 270, 280 may be sold and/or otherwise provided with a full complement of individual filter elements. In such instances, the reconfigurable optical filter assemblies 260, 270, 280 may be configured prior to and/or during field installation of the reconfigurable optical filter assemblies 260, 270, 280, e.g., by removing, replacing and/or otherwise rearranging one or more of the individual optical processing elements 279, 289.

In at least some embodiments, a limited number of individual optical processing elements 279, 289 may be provided, e.g., 3-5 elements. Performance of the individual optical processing elements 279, 289 may be selected in such a manner that the individual elements may be rearranged to obtain a larger number of reconfigurations than the number of different individua optical processing elements. Consider an arrangement with four optical processing elements 279, 289. One arrangement may include incorporation of all four optical processing elements 279, 289. Other combinations may be formed by removing one element at a time to obtain new combinations, until all possible combinations are explored. In at least some embodiments, removal and/or failure to insert one of the optical processing elements 279, 289 may result in an optical pass through for that removed element. For example, a removed and/or non-inserted optical processing element of the select group of elements 279, 289 may be replaced with an optical pass through, e.g., an all-pass, bandpass filter. At least one of the configurations may include none of the individual optical processing elements 279, 289, in which instances the optical processing module 278, 288 may represent an optical pass through or all-pass, bandpass filter.

Although the limited number of examples illustrate separate configurations for serial arrangements (FIG. 6) and parallel arrangements (FIG. 7), it is understood that at least some combinations may include combinations of serial and parallel configurations of the optical processing elements 279, 289. For example, a housing of a reconfigurable optical processing module may be adapted to accept individual optical processing elements in parallel arrangement, a series arrangement and/or a combination of both parallel and series.

In at least some embodiments, one or more of the optical distribution networks 264, 274, 284 (FIGS. 6, 7 and 8) may be connectorized and interchangeable. Such reconfigurations of the optical distribution networks 264, 274, 284 may facilitate reconfigurations between parallel arrangements, series arrangements and/or combinations of both.

Figure 8:
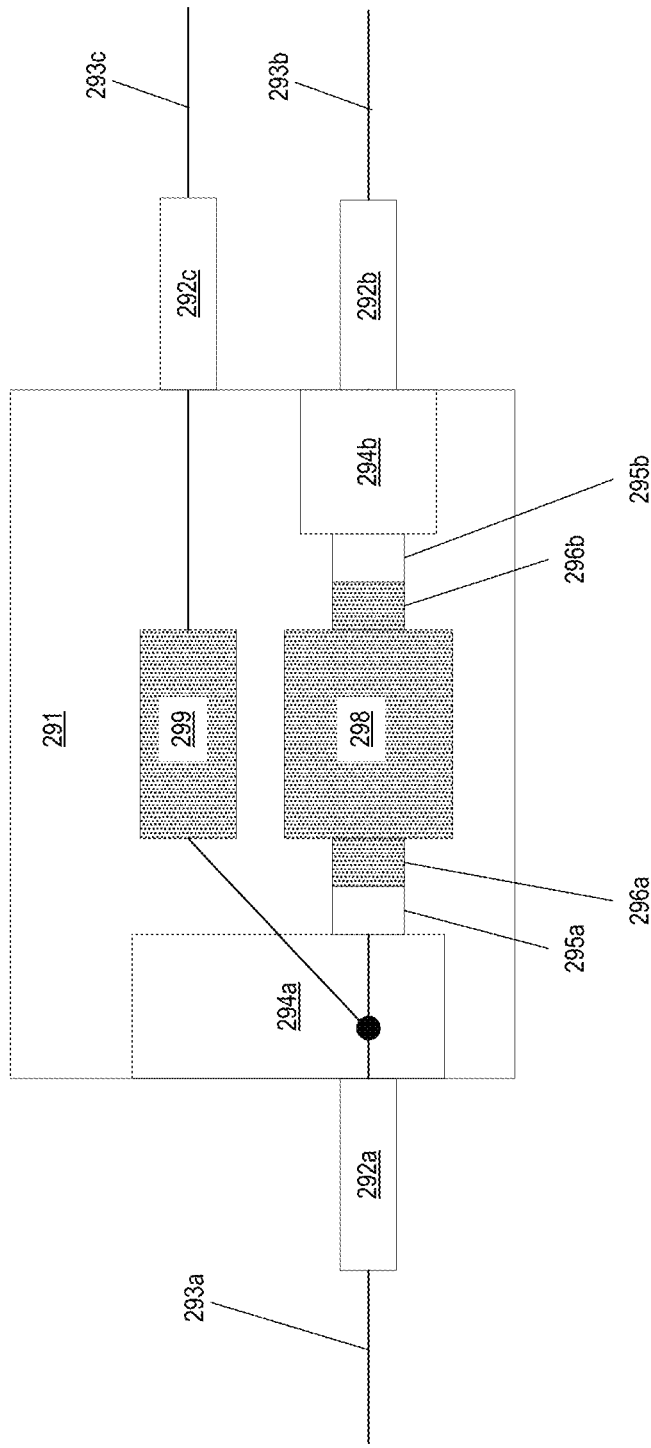
FIG. 8 is a block diagram illustrating yet another example, non-limiting embodiment of a reconfigurable optical filter functioning within the PONs of FIG. 2 through FIG. 4 and the communication network of FIG. 1 in accordance with various aspects described herein.

FIG. 8 is a block diagram illustrating yet another example, non-limiting embodiment of a reconfigurable optical filter 290 functioning within the reconfigurable PONs 200, 220, 250 of FIG. 2 through FIG. 4 and the system 100 of FIG. 1 in accordance with various aspects described herein. The reconfigurable optical filter 290 includes a housing 291 configured with a first optical port 292a coupled to a first optical fiber 293a and a second optical port 292b coupled to a second optical fiber 293b and a third optical port 292c coupled to a third optical fiber 293c. The reconfigurable optical filter 290 further includes a passive optical processing module 298, a first optical distribution network 294a and a second optical distribution network 294b.

The first optical distribution network 294a is optically coupled between the first optical port 292a and the passive optical processing module 298. Likewise, the second optical distribution network 294b is coupled between the second optical port 292b and the passive optical processing module 298.

According to the illustrative example, a first end of the first optical distribution network 294a is optically coupled to the first optical port 292a, while a second end of the first optical distribution network 294a is optically coupled to a first housing connector portions 295a. A first end of the passive optical processing module 298 is optically coupled to a first module connector portion 296a. The first housing connector portion 295a is configured to engage the first module connector portion 296a to form a low-loss optical path or channel therebetween. The interconnection and resulting low-loss optical path allow optical signals to pass between the first optical distribution network 294a and the passive optical processing module 298.

Similarly, a first end of the second optical distribution network 294b is optically coupled to the second optical port 292b, while a second end of the second optical distribution network 294b is optically coupled to a second housing connector portion 295b. A second end of the passive optical processing module 298 is optically coupled to a second module connector portion 296b. The second housing connector portion 295b and the second module connector portion 296b are configured to engage each other to form a low-loss optical path or channel therebetween, allowing optical signals to pass between the second optical distribution network 294b and the passive optical processing module 298. It is understood that the first and second housing connector portions 295a, 295b and the first and second module connector portions 296a, 296b may include any of various examples disclosed herein and/or otherwise known by those familiar with optical communication systems. According to the illustrative embodiments, the passive optical processing module 298 any of the various embodiments disclosed herein, e.g., parallel configurations, series configurations, composite modules, and so on.

According to the illustrative embodiment, the first optical distribution network 294a includes a 1×2 optical signal or power splitter that directs a light signal received from the first optical fiber 293a into two divisions, with one division applied to the example passive optical processing module 298 and another division applied to a second optical processing module 299. The second optical processing module 299 may be connectorized for remove and replace. Alternatively, the second optical processing module 299 may be integrated into the reconfigurable optical filter 290. For example, the second optical processing module 299 may be configured to pass only an OAM band, e.g., an OAM wavelength of about 1650 nm. The 1×2 splitter with the second optical processing module 299 may be fixed and/or otherwise integrated into the reconfigurable optical filter 290. It is envisioned that in at least some embodiments, such a fixed, dedicated OAM port may be incorporated into some or all reconfigurable optical filters 290. A dedicated OAM channel as provided by the separate optical processing module 299 may be used for OAM testing and/or evaluation, such as OTDR measurements, without necessarily disturbing operational spectrum band(s). In such instances, the third optical port 292c may be referred to as a dedicated OAM port.

Figure 9:
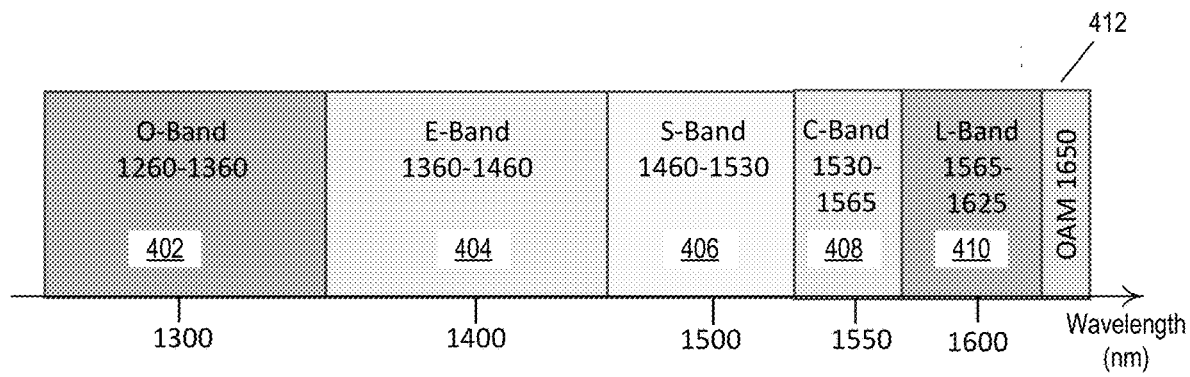
FIG. 9 is a block diagram illustrating an example of a wavelength grid.

FIG. 9 is a block diagram illustrating an example of a wavelength grid 400. According to ITU-T G.694.2 an optical fiber transmission spectrum has been classified into distinguishable optical transmission bands. These telecommunication wavelength bands include the O-band 402 extending between 1260 and 1360 nm), the E-band 404 extending between 1360 and 1460 nm, the S-band 406 extending between 1460 and 1530 nm, the C-band 408 extending between 1530 and 1565 nm, the L-band 410 extending between 1565 to 1625 nm, and the U-band extending between 1625 and 1675 nm. According to the illustrative example, the U-band includes an OAM band 412 on and/or about 1650 nm.

Figure 10:
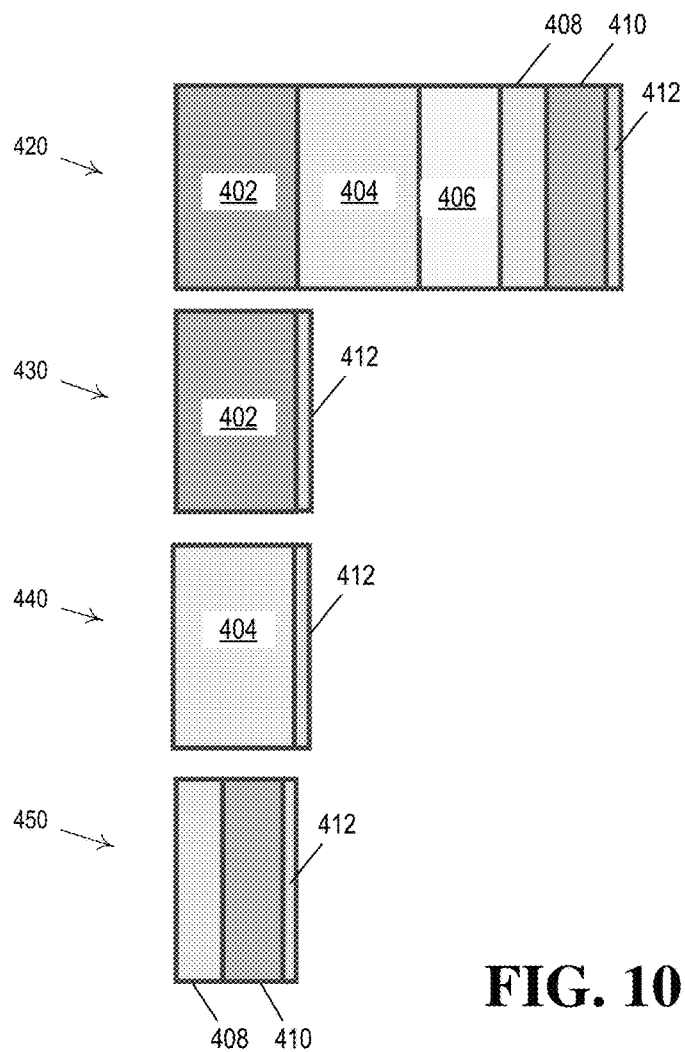
FIG. 10 is a block diagram illustrating example, non-limiting embodiments of operational bandwidths established by reconfigurable optical filter modules functioning within the PONs of FIG. 2 through FIG. 4 and the communication network of FIG. 1 in accordance with various aspects described herein.

FIG. 10 is a block diagram illustrating example, non-limiting embodiments of operational bandwidths established by reconfigurable optical filter modules functioning within the reconfigurable PONs 200, 220, 250 of FIG. 2 through FIG. 4 and the system 100 of FIG. 1 in accordance with various aspects described herein. A first operational bandwidth 420 as may be established by a first established by a first reconfigurable optical filter module, includes a full spectrum, e.g., including the O-band 402, the E-band 404, the S-band 406, the C-band 408, the L-band 410 and the OAM band 412. For example, the first reconfigurable optical filter module may include an optical pass through, e.g., a length of optical waveguide or fiber, without any other filter components. Alternatively, or in addition, the first reconfigurable optical filter module may include a high pass filter passing only those wavelengths above 1260 nm, a lowpass filter passing only those wavelengths below about 1650 nm, and or a bandpass filter passing only those wavelengths between about 1260 nm and 1650 nm.

A second operational bandwidth 430 as may be established by a second reconfigurable optical filter module, includes a low band spectrum, e.g., including the O-band 402. According to the illustrative embodiment, the second reconfigurable optical filter module may also be configured to pass the OAM band 412. For example, the second reconfigurable optical filter module may include a bandpass filter arrangement passing only those wavelengths in a first region between about 1260 nm and 1360 nm, and a second region about 1650 nm. Operation in this band may include CWDM communications.

Similarly, a third operational bandwidth 440 as may be established by a third reconfigurable optical filter module, includes a medium band spectrum, e.g., including the E-band 404. According to the illustrative embodiment, the third reconfigurable optical filter module may also be configured to pass the OAM band 412. For example, the third reconfigurable optical filter module may include a bandpass filter arrangement passing only those wavelengths in a first region between about 1360 nm and 1460 nm, and a second region about 1650 nm.

A fourth operational bandwidth 450 as may be established by a fourth reconfigurable optical filter module, includes a medium band spectrum, e.g., including the C-band 408 and L-band 410. According to the illustrative embodiment, the fourth reconfigurable optical filter module may also be also configured to pass the OAM band 412. For example, the fourth reconfigurable optical filter module may include a bandpass filter arrangement passing only those wavelengths in a first region between about 1530 nm and 1625 nm, and a second region about 1650 nm. Alternatively, or in addition, the fourth reconfigurable optical filter module may include a high pass filter passing those wavelengths above about 1530 nm. Operation in this band may include DWDM communications.

It is understood that one or more reconfigurable optical filter modules may be configured to provide other filter arrangements, including but not limited to other arrangements of the O, E, S, C, L, U and/or OAM bands 402, 404, 406, 408, 410, 412. In at least some embodiments, the configurable optical filter modules may be configured to provide only portions of one or more of the example bands, e.g., a lower half of the O-band 402 and/or a middle portion of the E-band 404.

Figure 11:
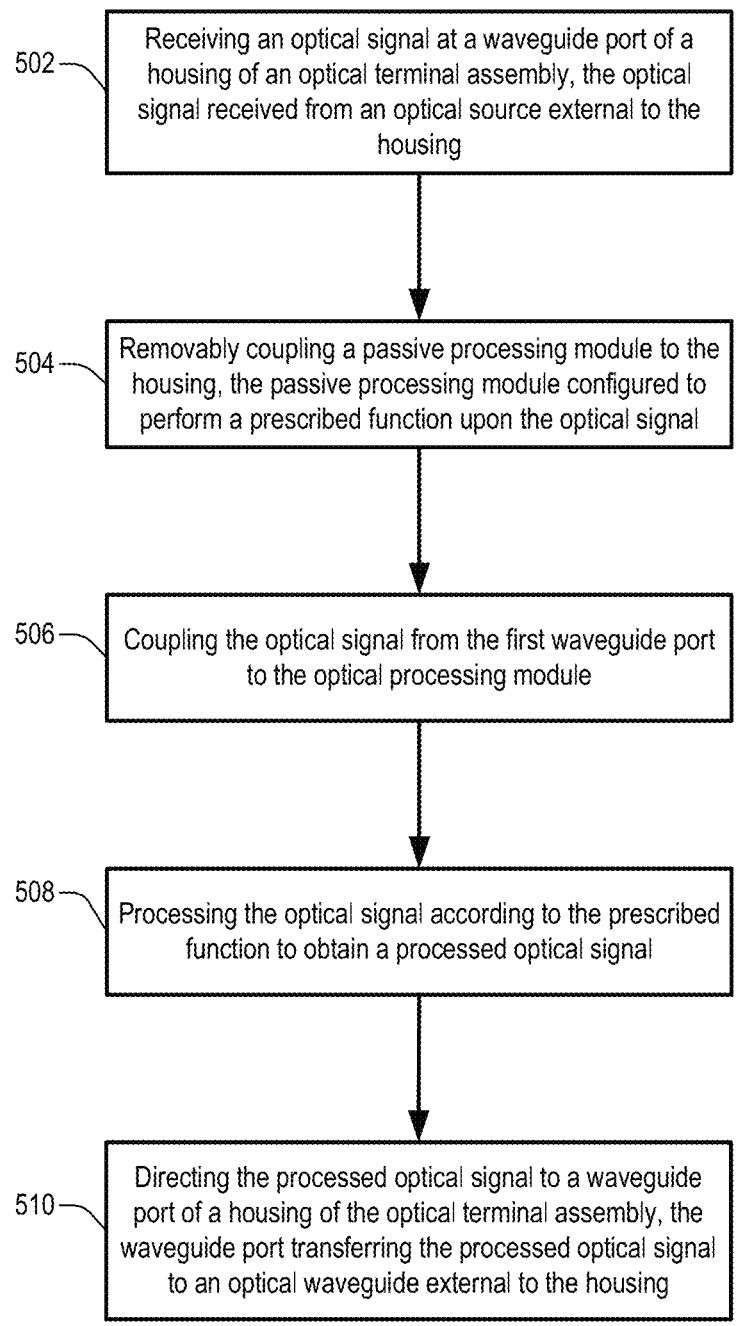
FIG. 11 depicts an illustrative embodiment of a process in accordance with various aspects described herein.

FIG. 11 depicts an illustrative embodiment of an optical conditioning process 500 in accordance with various aspects described herein. According to the optical conditioning process 500, an optical signal, at 502, is received at a waveguide port of a housing of an optical terminal assembly. The optical signal is received from an optical source that is external to the housing. For example, the optical source may be a transponder, a mux-ponder and/or a switch-ponder as may be operated by equipment of a communication service provider and/or equipment of a service subscriber or client. In at least some embodiments the optical signal is received via an optical waveguide, e.g., an optical fiber, optically coupled between the optical source and the optical terminal assembly. The signal may include one or more operational wavelengths within an optical channel bandwidth, e.g., as classified in ITU-T 694.2. Optical signals having more than one operational wavelength may be referred to as colored light, e.g., as may be utilized for WDM applications.

A passive processing module is removably coupled, at 504, to the housing. The passive processing module is configured to perform a prescribed function upon at least a portion of the received optical signal. Passive processing includes optical processing without the assistance of an electronic circuit. Alternatively, or in addition, passive processing includes optical processing without the assistance of a mechanical and/or electromechanical circuit. In at least some embodiments, the processing module may be referred to as a static device, in that it may be configurable and/or reconfigurable between periods of operation, but that during operation, the processing module is static. In at least some embodiments, the passive processing module consists of little more than glass and modified glass materials, e.g., shaped, doped and/or coated glass.

It is understood that in at least some embodiments, the passive processing module may incorporate one or more semiconductor devices, but that any processing done by such semiconductor devices does not depend on an electrical circuit and/or an electromechanical circuit. For example, a semiconductor device may incorporate optical waveguides and other optical structures, such as power splitters, power combiners, reflectors and the like.

According to the example process, the optical signal is coupled, at 506, from the first waveguide port to the optical processing module. It is envisioned that the optical processing module may incorporate a connectorized module that may be inserted into the housing and connected to one or more optical ports. It is by these connected ports that the optical processing module receives a signal to be processed and provides a processed signal to be routed elsewhere. According to the example arrangement, the optical signal may be coupled from the first waveguide port to the optical processing module via one or more make-and-break, or otherwise repeatable, optical connectors. The coupling may be accomplished at least in part by an optical waveguide provided within the housing. The waveguide may incorporate one or more of an optical fiber or an optical waveguide formed upon a substrate, such as a semiconductor substrate.

The optical signal is processed, at 508, according to the prescribed function to obtain a processed optical signal. Optical processing may include, alone or in combination, any of the various processing techniques disclosed herein and/or otherwise known to those skilled in optical communications. For example, the optical processing may include optical signal splitting or dividing and/or optical signal combining or summing. Alternatively, or in addition, optical processing may include one or more of reflection, refraction, diffraction, attenuation, and the like. According to the illustrative examples, the optical processing may operate upon an optical signal to employ some aspect of filtering. Without limitation, filtering may include high pass filtering, low pass filtering, bandpass filtering notch filtering and so on.

Directing, at 510, the processed optical signal to a waveguide port of a housing of the optical terminal assembly, the waveguide port transferring the processed optical signal to an optical waveguide external to the housing. Once again, the optical processing module may incorporate a connectorized module that may be inserted into the housing and connected to one or more optical ports. It is by these connected ports that the optical processing module directs the processed optical signal to a second waveguide port of the housing. According to the example arrangement, the processed optical signal may be coupled from the optical processing module to the second waveguide port via one or more make-and-break, or otherwise repeatable, optical connectors. The coupling may be accomplished at least in part by an optical waveguide provided within the housing. The waveguide may incorporate one or more of an optical fiber or an optical waveguide formed upon a substrate, such as a semiconductor substrate.

While for purposes of simplicity of explanation, the respective processes are shown and described as a series of blocks in FIG. 11, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The techniques disclosed herein include the configuration, reconfiguration and deployment and/or use of intelligent optical terminal assemblies that implement intelligence to processing of one or more optical signals by built-in interchangeability of passive optical processing modules and without necessarily requiring the use of electronics and/or processors. In at least some embodiments, the intelligent optical terminals are completely passive, utilizing optical fiber and/or other glass-based components, to extend an ability to modularly change a passive optical network, or a dark fiber deployment.

In at least some embodiments, the passive optical processing modules allow a customer to operate within one or more particular regions of an available optical spectrum. Through the built-in interchangeability and/or replaceability of the optical processing modules, a PON may be upgraded without requiring any splicing and/or re-splicing of optical fibers as might otherwise be necessary to replace a device. In at least some embodiments, the upgrade may include a rebuild of a fiber system's operational spectrum.

In at least some embodiments, the reconfigurable optical terminal includes a housing having a form factor adapted for an intended installation. For example, the form factor may include a standard equipment rack configuration for deployments at an operator's headend. Alternatively, or in addition, the form factor may include a compact, environmentally protected enclosure suitable for external mounting, buried applications and/or deployment at or near a customer's location. The housing may include an interior compartment configured to accept one or more pluggable optical processing modules. In at least some embodiments, the interior compartment includes optical connectors fixedly attached with respect to the housing. The optical connectors are positioned to mate with the optical processing modules. For example, the optical connectors may be adapted for interconnection coincident with insertion of the optical processing module into an accommodating channel and/or slot. In at least some embodiments, such as those intended for external environmental deployments, the compartment may be protected by a door, an environmental seal, e.g., a watertight seal, thermal insulation, armored protection and the like.

Beneficially, the housing with its optical connections permits field replacement of one or more of the optical processing modules without necessarily requiring specialized skill and/or tools, as might otherwise be required, e.g., for fiber splicing. As mentioned elsewhere herein, insertion, removal and/or reconfiguration of one or more optical processing modules within an optical terminal housing assembly may permit a realignment of operational wavelengths, bands and/or channels. In some applications the reconfigurable optical terminal may be referred to as a dark fiber intelligent terminal (DFIT), e.g., designed to customize spectrum co-existence.

By its nature as a PON, a configuration and/or reconfiguration allows the PON to adapt to different region(s) of the optical channel spectrum on the same optical fiber. Such flexibility allows a customer to utilize their allocated optical channel spectrum any way they want, as long as operate within the allocated spectrum. Such flexibility further facilitates an efficient, e.g., full, usage of dark-fiber spectrum. For example, different bands may be allocated to different users, different customers, different applications and so on. By further promoting operation of an optical fiber system efficiently, with a smallest amount of optical channel spectrum, may limit use cases for one user, while making other portions of the same optical fiber spectrum available for other uses and/or other customers. In at least some instance, such efficiencies afforded by the techniques disclosed herein may preserve channels for future uses and/or allocations. Thus, a communications service provider may deploy such reconfigurable optical terminal assemblies to build a revenue tiering, without requiring active components.

In more detail, the optical processing modules and/or elements may employ one or more optical filter devices. Examples include, without limitation, bandpass filters, absorptive filters, dichroic filters, and so on. An optical filter may be configured to selectively transmit one portion of an optical spectrum, while rejecting other portions. Some filters may be characterized as fiber optic filters. For example, fiber optic filters may use a fiber optic grating systems to filter or scatter particular wavelengths of light. In at least some embodiments, a fiber grating system uses a specially treated optical fiber that has a core with a specific refractive index that varies along the length of the fiber. Other fiber optics filters may be used with fiber optic coupling devices that either combine the input signal from two or more optical fibers into one output and/or distribute the signal from one input fiber into two or more outputs. A fiber optic coupling filter selects for a specific incoming or outgoing wavelength, depending upon the configuration of the coupler.

Bandpass filters are used in a wide range of industries and can be either dichroic or color substrate. Such filters may achieve their unique transmission and reflection properties by a deposition of numerous layers of alternating high and low index of fraction materials onto glass substrates. Absorptive filters elements may be deployed alone or in combination with other optical devices to block unwanted portions of the optical spectrum. For example, optical signal light may be blocked according to absorption properties of an optical waveguide and/or glass substrate used. In such applications, light that is blocked does not reflect off the filter; rather, it is absorbed and contained within the filter. Absorptive filters may be well suited applications in which noise from unwanted light is an issue.

Dichroic devices reflect unwanted wavelengths, while transmitting desired portion of the spectrum. In some applications, this may be desirable to separate light by wavelength into two sources. Such separation may be achieved by adding a layer, or multiple layers, of material of varying indexes of refraction to exploit the interference nature of light waves. In interference filters, light traveling from a lower index material will reflect off a higher index material; only light of a certain angle and wavelength will constructively interfere with the incoming beam and pass through the material, while all other light will destructively interfere and reflect.

Filters may be described according to a center wavelength, used in defining bandpass filters. The center wavelength describes a midpoint of a spectral bandwidth over which the filter transmits. Other filters may be described as low-pass and/or long-pass filters. Long-pass filters generally transmit substantially all wavelengths longer than the specified cut on wavelength. Operation of a long-pass filter may be described according to a cut-on lavelength, generally denoting a wavelength at which optical transmission through the filter increases to 50% throughput. Still other filters include high-pass and/or short-pass filters. short-pass filters generally transmit substantially all wavelengths shorter than a specified cut off wavelength. Operation of a short-pass filter may be described according to a cut-off lavelength, generally denoting a wavelength at which optical transmission through the filter increases to 50% throughput. Yet other example filters include notch filters, which are designed to block a pre-selected bandwidth, while transmitting substantially all other wavelengths within a design range of the filter. Notch filters may be used to remove a single laser wavelength, and/or a narrow band of wavelengths, from an optical system. In some applications, a blocking range represents a wavelength interval used to denote a spectral region of energy that is attenuated by the filter.

In the subject specification, the term "optical" is given the meaning used by those skilled in the art, that is, "optical" generally refers to that part of the electromagnetic spectrum which is generally known as the visible region together with those parts of the infrared and ultraviolet regions at each end of the visible region which are capable of being transmitted by dielectric optical waveguides such as optical fibers. Therefore, discussion of the output of laser devices in this specification includes optical outputs from such laser devices within the portions of the electromagnetic spectrum discussed immediately above.

It is understood that the various components disclosed herein may use any one or more of the various light modification and/or filtering techniques disclosed herein. Such combinations may be used to established one operational band, while rejecting others. Other combinations may be used to establish more than one operational bands that may be adjacent and/or separated by a spectral gap that rejects optical transmission.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An optical terminal assembly, comprising:
a housing defining an interior region and comprising a first waveguide port and a second waveguide port, wherein the first waveguide port is configured for receiving a first optical signal via a first optical waveguide optically coupled to the first waveguide port, and wherein the second waveguide port is configured for providing a second optical signal to a second optical waveguide optically coupled to the second waveguide port;
a first optical coupler located within the interior region of the housing and in optical communication with the first waveguide port;
a second optical coupler located within the interior region of the housing in optical communication with the second waveguide port;
a passive optical processing module removably coupled to the first and second optical couplers and configured to perform a prescribed function upon the first optical signal to obtain the second optical signal without utilizing an electronic circuit;
an optical splitter generating a subdivision of the first optical signal;
a bandpass filter in communication with the optical splitter configured to pass a narrow optical bandwidth of the subdivision of the first optical signal associated with an operation, administration and/or maintenance (OAM) activity; and
a third waveguide port in communication with the bandpass filter and configured to transfer the subdivision of the first optical signal to an OAM monitoring system.

2. The optical terminal assembly of claim 1, further comprising:
a support structure fixedly coupled to an interior region of the housing, wherein the support structure provides a retaining feature adapted to retain the passive optical processing module in optical engagement with the first and second optical couplers.

3. The optical terminal assembly of claim 1, wherein one of the first and second optical couplers comprises a make-and-break optical connector.

4. The optical terminal assembly of claim 3, wherein the make-and-break optical connector comprises a standard fiber optic connector.

5. The optical terminal assembly of claim 1, wherein the passive optical processing module comprise a plurality of optical processing elements optically coupled to each other and to the first and second optical couplers.

6. The optical terminal assembly of claim 5, wherein the plurality of optical processing elements comprises at least one optical filter element.

7. The optical terminal assembly of claim 6, wherein the at least one optical filter element comprises a long-pass filter configured to pass wavelengths above a first cutoff wavelength, while preventing transmission of wavelengths below the first cutoff wavelength.

8. The optical terminal assembly of claim 6, wherein the at least one optical filter element comprises a short-pass filter configured to pass wavelengths below a second cutoff wavelength, while preventing transmission of wavelengths above the second cutoff wavelength.

9. The optical terminal assembly of claim 6, wherein the at least one optical filter element comprises a bandpass filter configured to pass wavelengths within a bandwidth about a center frequency.

10. The optical terminal assembly of claim 1, wherein the passive optical processing module comprises at least one of a long-pass filter, a short-pass filter or a bandpass filter configured to perform the prescribed function upon the first optical signal.

11. The optical terminal assembly of claim 1, further comprising:
a second optical terminal assembly including a second optical processing module that is configured to provide a pass-through function.

12. A method, comprising:
receiving an optical signal at a first optical waveguide port of a housing of an optical terminal assembly defining an interior region, the optical signal received from an optical source external to the housing;
removably coupling a passive optical processing module to the interior region of the housing, the passive optical processing module configured to perform a prescribed function upon the optical signal;
coupling the optical signal from the first optical waveguide port to the passive optical processing module;
processing the optical signal according to the prescribed function to obtain a processed optical signal;
directing the processed optical signal to a second optical waveguide port of the housing of the optical terminal assembly, the second optical waveguide port transferring the processed optical signal to an optical waveguide external to the housing;
generating a subdivision of the optical signal;
applying a bandpass filter to the subdivision to obtain an operation, administration and/or maintenance (OAM) channel of the subdivision; and
directing a portion of the subdivision within the OAM channel toward a third optical waveguide port of the housing.

13. The method of claim 12, wherein the coupling the optical signal from the first optical waveguide port to the passive optical processing module further comprises engaging an optical connector to obtain an optical engagement.

14. The method of claim 13, wherein the engaging the optical connector further comprises a blind mating process, wherein at least a portion of the optical connector is occluded by the passive optical processing module during the removably coupling of the passive optical processing module to the interior region of the housing.

15. The method of claim 13, wherein the removably coupling the passive optical processing module to the interior region of the housing further comprises engaging, by the passive optical processing module, a mechanical faster securely attached to the interior region of the housing to maintain an optical alignment provided by the engaging of the optical connector.

16. The method of claim 12, wherein the processing the optical signal further comprises applying at least one of a long-pass filter, a short-pass filter or a bandpass filter to the optical signal to obtain the processed optical signal.

17. The method of claim 12, further comprising:
providing a first optical terminal assembly including the passive optical processing module; and
providing a second optical terminal assembly including a second optical processing module configured to provide a pass-through function.

18. An assembly, comprising:
a housing comprising a first waveguide port and a second waveguide port, wherein the first waveguide port is configured for receiving an optical signal via a first optical waveguide optically coupled to the first waveguide port;
a passive optical processing module removably coupled to the housing and optically coupled to the first waveguide port, wherein the passive optical processing module is configured to perform a prescribed function upon the optical signal to obtain a processed optical signal without utilizing an electronic circuit; wherein the second waveguide port is configured to transfer the processed optical signal to an optical waveguide external to the housing;
an optical splitter generating a subdivision of the optical signal;
a bandpass filter in communication with the optical splitter configured to pass a narrow optical bandwidth of the subdivision of the optical signal associated with an operation, administration and/or maintenance (OAM) activity; and
a third waveguide port in communication with the bandpass filter and configured to transfer the subdivision of the optical signal to an OAM monitoring system.

19. The assembly of claim 18, further comprising:
a first portion of an optical connector coupled to the housing and a second portion of the optical connector coupled to the passive optical processing module, wherein the passive optical processing module is coupled to the first waveguide port according to an interconnecting of the first portion and the second portion of the optical connector.

20. The assembly of claim 18, wherein the passive optical processing module comprises at least one of a long-pass filter, a short-pass filter or a bandpass filter configured to perform the prescribed function upon the optical signal.

* * * * *